June 22, 1937. A. T. HARRIS 2,084,844
POWER TRANSMISSION DEVICE
Filed July 20, 1935 4 Sheets-Sheet 1
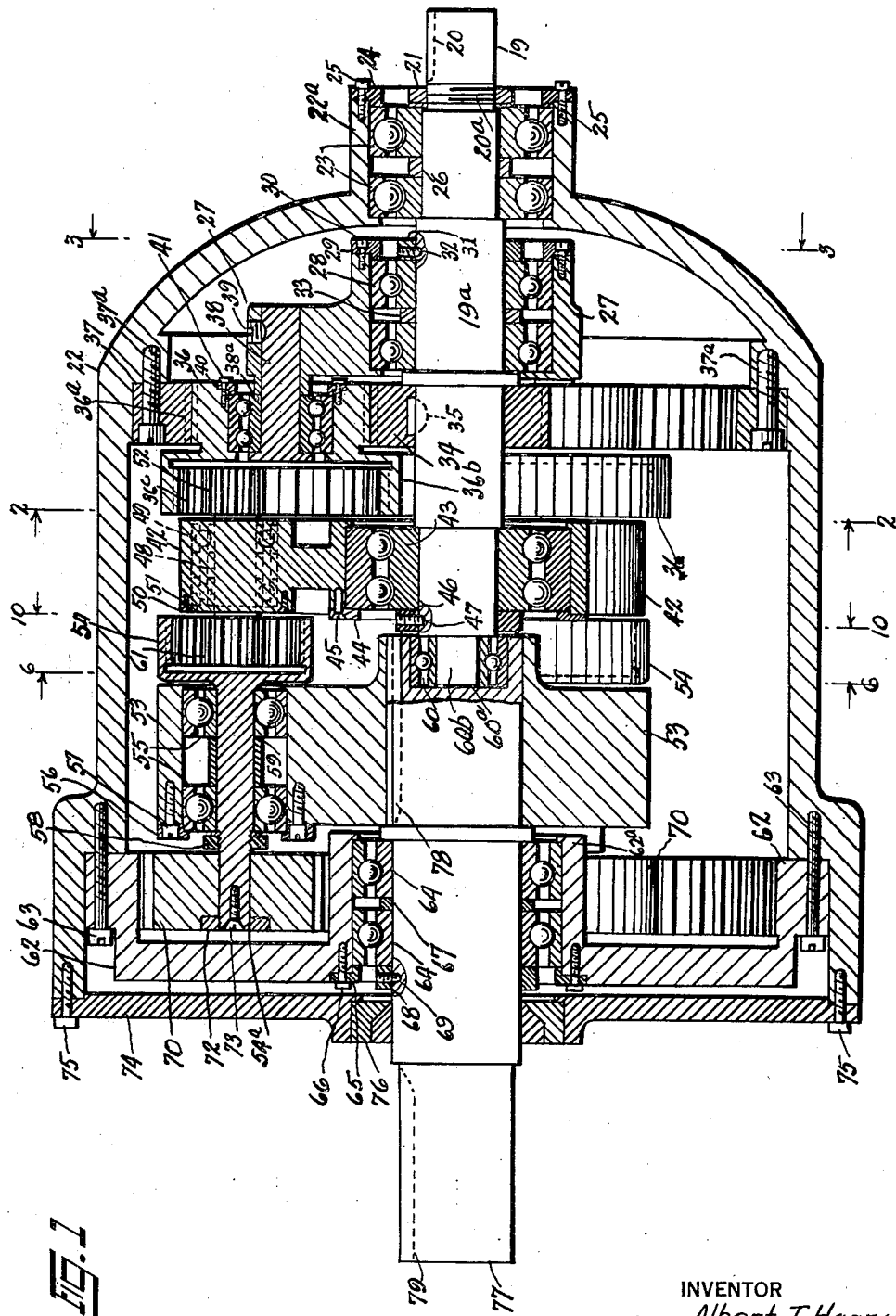
INVENTOR
*Albert T. Harris*
BY
ATTORNEY

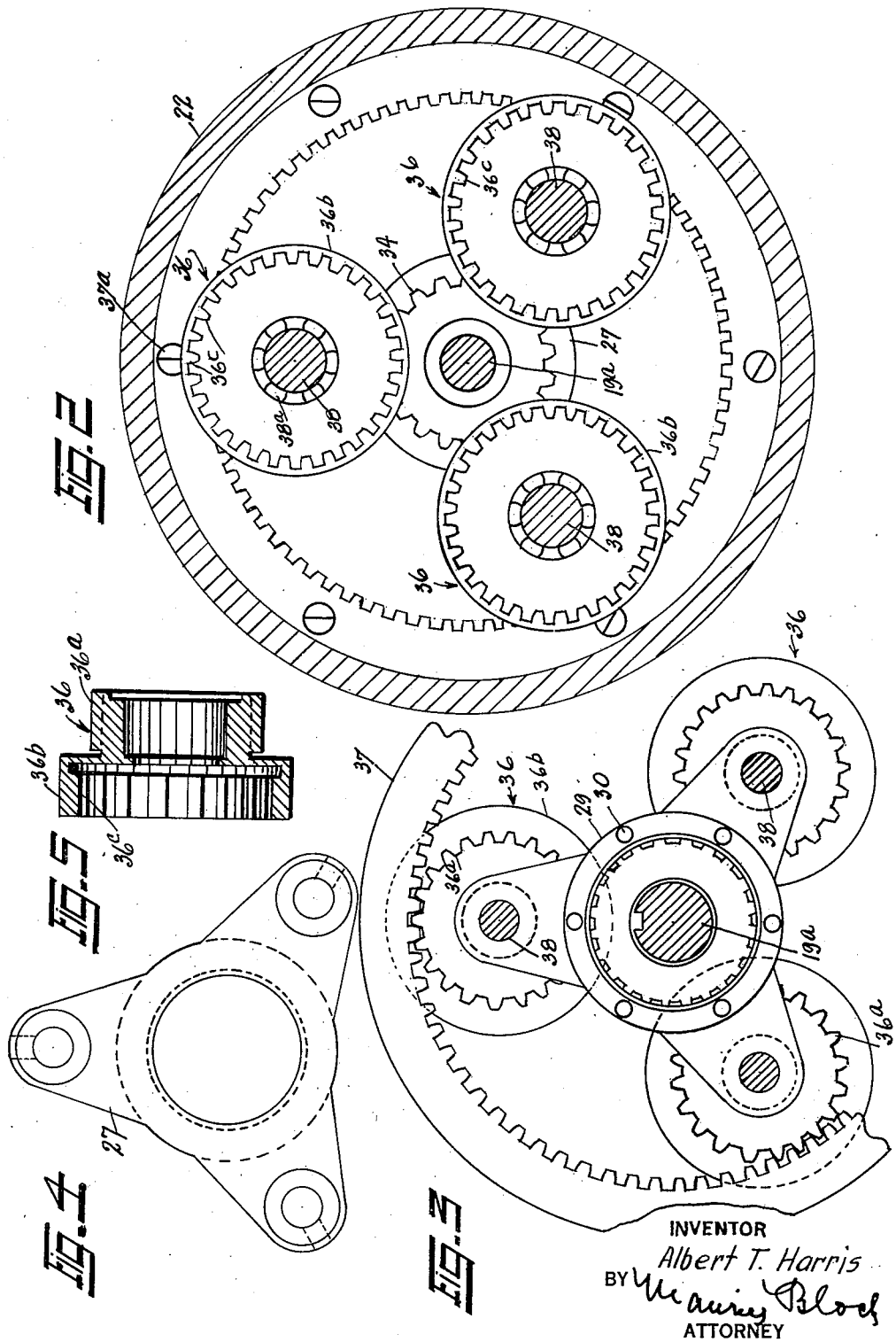

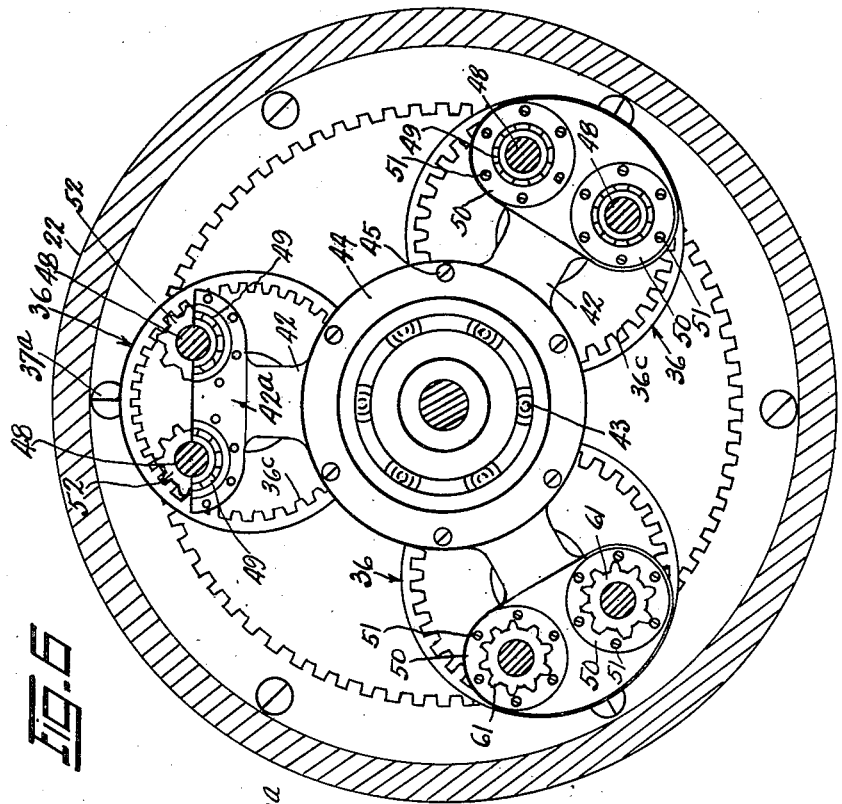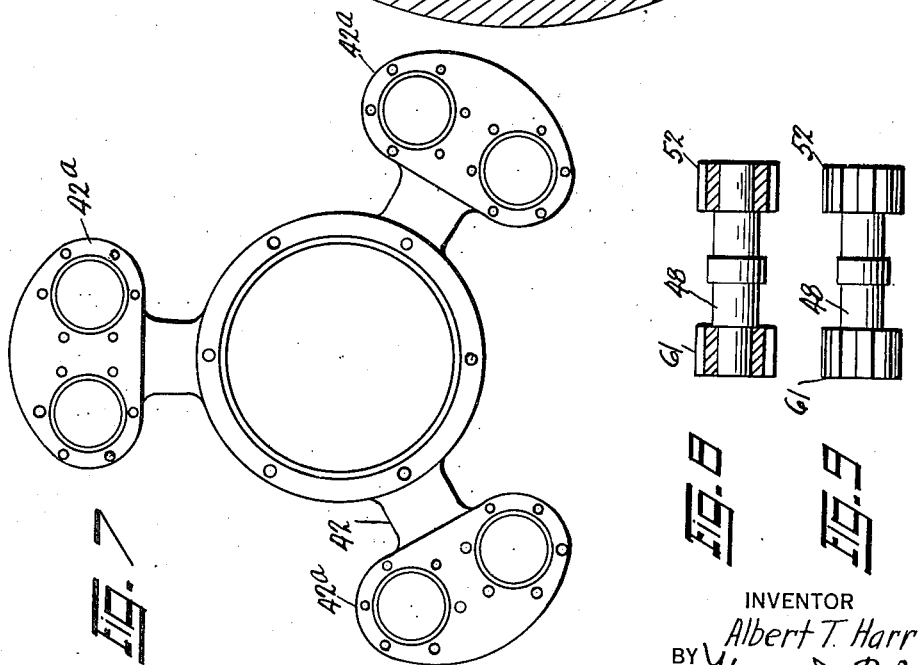

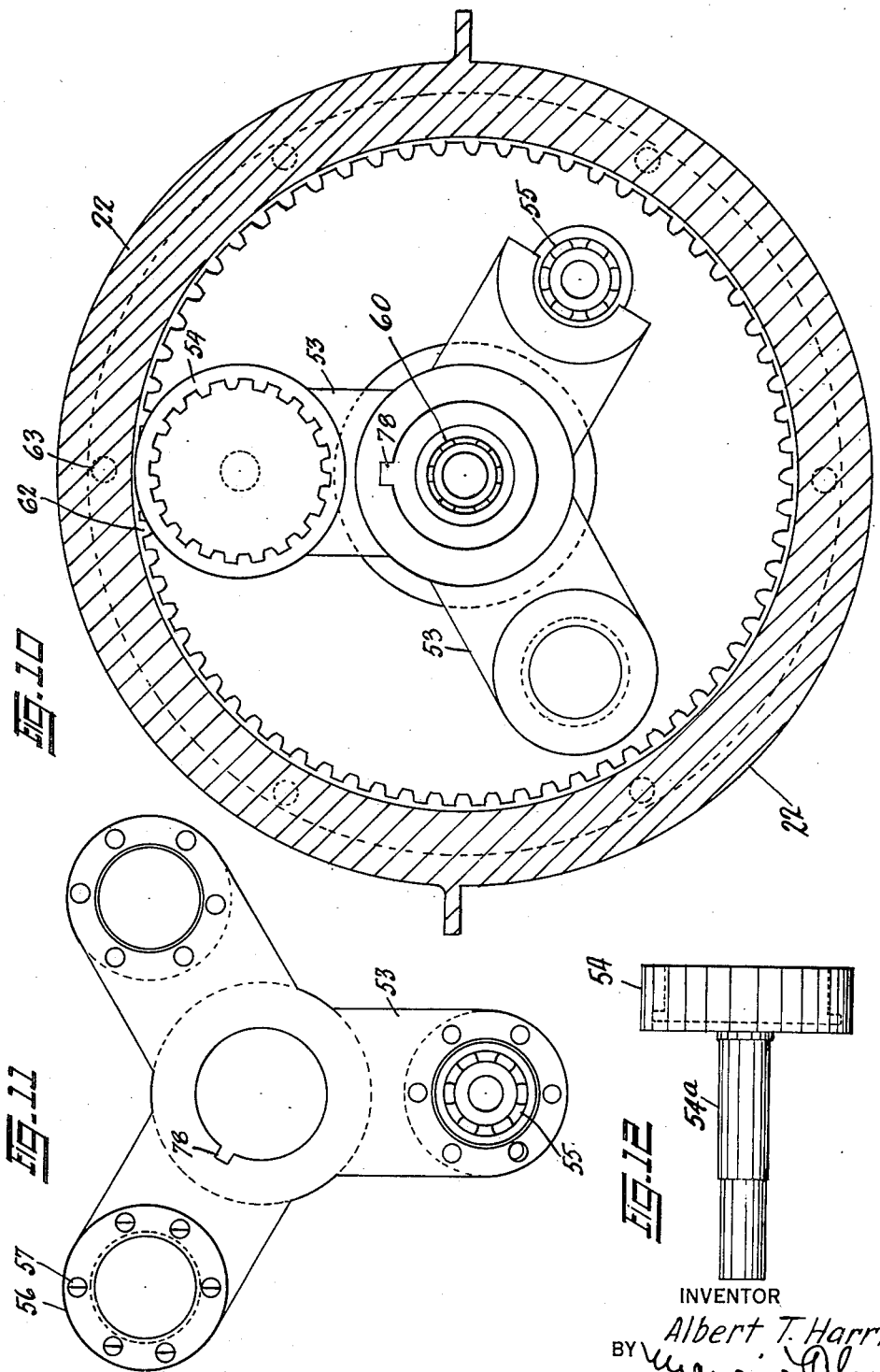

Patented June 22, 1937

2,084,844

UNITED STATES PATENT OFFICE 2,084,844

POWER TRANSMISSION DEVICE

Albert T. Harris, New York, N. Y., assignor to A. T. Harris Holding Corporation, New York, N. Y., a corporation of New York Application July 20, 1935, Serial No. 32,367

4 Claims. (Cl. 74—305)

This invention relates to power transmission and torque increasing devices adapted to be used in combination with various power developing units such as, motors, engines, etc.

One of the objects of the invention is the provision of a device of this character wherein the line of action of the force or torque leaving the planetary gears travels around two or more centers.

A further object of this invention is to produce a device of this nature wherein the forces and actions of the said forces are changed so as to build up a combination of forces and velocities, which, when leaving the device are greater than when received by the device.

A still further object of this invention is to produce a device of the character referred to, which is so constructed and mechanically arranged that the two principles involved in "horse power" is expanded in this device by changing the line of action and the line of travel, and whereby the so-called expansion of power is created by and through the arrangement of the gears and corelating parts. By changing the relations of one gear to another in a manner set forth in this application, the aforementioned results are obtained.

Another object of the invention is to produce such a device comprising planetary gears, idlers and other cooperating parts whereby the force and velocity taken off from the planetary gears is taken off from a point or line outside or beyond the center line of said planetary gears, thereby increasing the leverage on the said planetary gears. The arrangement of the gears and idlers is such that the meshing point of the idler and planetary gear teeth is the power distribution point from the planetary gear to the idler gear, thence to the next co-related part.

Another object of this invention is to produce a device of this nature, whereby the torque that is received by the driving shaft is sent forth outwardly beyond two or more centers and back again to the driven shaft, so that the outgoing torque will be greater than the incoming torque.

Still another object of the invention is the provision of a device of this character wherein the gear relations or reductions can easily be changed.

Yet another object of the invention is to produce such a device wherein the applied torque has little or no effect upon the constant speed of the driving mechanism, due to the large circumference or area that the forwarding point of action is operating on, as the forwarding power is leaving the planet gears outside or at a greater radius than the planet gear centers.

The device embodied in this invention is designed in accordance with the principles of leverage in mind, not as the common leverage whereby the travel is affected in accordance with the location of the pulling point in relation to the fulcrum, but a leverage whereby the travel is not affected in accordance with the forwarding point with respect to the fulcrum point. As shown in the present disclosure, the fulcrums are the points at which the planet gears mesh with the ring gears, the said fulcrums being rotatable and create rotary leverage and the travel or speed is not affected.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the drawings accompanying this specification,

Figure 1 is a longitudinal sectional view through the center of the device;

Figure 2 is a cross sectional view taken on line 2—2, Figure 1;

Figure 3 is a fragmental cross sectional view taken on line 3—3 Figure 1;

Figure 4 is a detail view in elevation of the planet gear carrying spider shown at the right of Figure 1;

Figure 5 is a cross sectional view through one of the planet gears.

Figure 6 is a sectional view taken on line 6—6, Figure 1, showing the planet gear, idlers and the spiders by which they are carried;

Figure 7 is a detail view in front elevation of the idler gear carrying spider;

Figure 8 is a sectional view of the idler gears which are secured to a common shaft;

Figure 9 is a side view in elevation of the said idler gears and shaft;

Figure 10 is a cross sectional view taken on line

10—10 Figure 1, showing a third spider and planet gears carried thereby;

Figure 11 is a detail view in elevation of the said spider;

Figure 12 is a detail view of one of the internal planet gears carried by the said spider.

Referring now to Figs. 1 to 12 of the drawings; 19 indicates one end of an input or drive shaft 19a having a keyway 20 for coupling or connecting same to a power producing device not shown. The said shaft may be threaded as at 20a for the reception of a locknut 21. A housing or casing 22 is provided for encasing the device and has at one end thereof a hollow boss or extension 22a in which there are located ball bearings 23 through which the shaft 19a passes. The said bearings 23 are maintained in place by a keeper or ring 24 secured to the end of the hub 22a by screws 25 and by the lock nut 21. A spacing washer 26 is interposed between the ball bearings 23.

A spider or carrier 27 is mounted on ball bearings 28 carried by the shaft 19a. The said ball bearings are separated by a spacing washer 33 and are maintained in place by a collar or ring 29 secured to the said spider by screws 30 and by a collar 31 secured to the shaft 19a by a set screw 32.

Secured to the shaft 19a by means of a key 35 is a sun gear 34 which is in mesh with the outer teeth 36a of a plurality of planetary gears 36 having an enlarged portion 36b provided with internal gear teeth 36c. The outer teeth 36a are also in mesh with the teeth of a ring gear 37 secured to the casing 22 by means of screws or bolts 37a. Driving pins 38 secured to the spider 27 by set screws 39 extend through ball bearings 38a in the planetary gears 36. The said ball bearings are maintained in place by means of keeper plates 40 secured to the gears 36 by screws 41.

A second spider or carrier 42 provided with a ball bearing 43 is mounted on the shaft 19a, the ball bearing 43 being maintained in place by a keeper 44 secured to one side of the spider and by means of a collar 46 secured to the shaft 19a by a set screw 47. The said spider 42 is provided at its outer ends with bearing blocks 42a in each of which are maintained a pair of ball bearings 49 by means of keepers 50 secured to the said ends by screws 51. Mounted in the said ball bearings 49 are shafts 48 each having an idler or pinion 52 secured at one of its ends and which is in mesh with the inner teeth 36c of the planet gears 36.

To the left of the spider 42 there is a third spider 53 which is keyed by means of a key 78 to a driven shaft 77. (See Figs. 1 and 9 to 12.) The spider 53 like the other spiders is provided with arms, in the ends of each of which there are a pair of ball bearings 55 in which there is mounted a shaft or extension 54a of an internally toothed planet gear 54. Each set of ball bearings 55 is maintained in place by a keeper or ring 56 secured to the spider by means of screws 57 and are spaced apart by a spacing washer 59. Lock nuts 58 on the shafts 54a act to properly position the planet gears 54. The said planet gears 54 are each in mesh with an idler or pinion 61 on the idler shaft 48 which shaft also carries the pinion 52. The forward end of the driven shaft 77 is provided with a recess 60a in which there is located a ball bearing 60 into which extends the end 66b of the drive shaft 19a.

At or near the extreme left hand or rear end of the casing 22 there is secured to the inside thereof a ring gear 62 by screws 63. The said ring gear is provided with a central hub 62a in which there are located a pair of ball bearings 64 held in place by a keeper 65 secured to the ring gear 62 by screws 66 and by a collar 68 secured to the driven shaft 77 by a set screw 69. A spacing washer 67 tends to space the said ball bearings apart within the hub 62a. A planet gear 70 is suitably secured to each internal planet gear shaft or extension 54a and is in mesh with the ring gear 62. A collar 72 secured to the end of the extension 54a by a screw 73 aids in maintaining the said gear on the said shaft or extension.

An end plate 74 closes the housing 22 and is secured thereto by screws 75. Centrally located in the end plate 74 is an oil seal 76 through which the driven shaft 77 passes. The said driven shaft is provided at its outer end with a keyway 79 to adapt same for coupling it to a mechanism to be driven.

It will be noted by referring to Fig. 6 of the drawings that the power take-off pinions 52 are positioned at approximately a forty-five degree angle to the center of their planet gears 36. It will further be seen that their meshing points are beyond or outside the center of the said planetary gears. This arrangement produces an increased leverage and resultant force, the power take-off pinions traveling about the centers of the planet gears as well as about the center of the driving and driven shafts.

The operation of the device is as follows:

Power is applied to the shaft 19a and forwarded by means of the sun gear 34 to the planetary gears 36 from the internal teeth 36c of which it is taken off by means of the pinions 52 and transferred by the pinions 61 to the planetary gears 54, and thence to the planetary gears 70 which are in mesh with the ring gear 62. The rotation of the gears 54 and 70 causes the spider 53 to rotate and carry with it the delivery shaft 77.

From the foregoing it will be seen that I have provided a highly efficient power transmitting and generating device.

Having described my invention, what I claim as new and desire to secure by Letters Patent is:

1. In a device of the nature described, comprising a drive shaft, a driven shaft, and a unit driven by the said drive shaft, the said unit including a sun gear on the drive shaft, a carrier mounted to rotate about the drive shaft, a planet gear carried by the carrier having a toothed portion in mesh with the sun gear to be driven by the same, a second toothed portion on the planet gear, a second carrier rotatable about the drive shaft, a carrier on the driven shaft, a planet gear carried by the driven shaft carrier, a power take-off and a power transfer pinion carried by the second mentioned carrier, the power take-off pinion being in mesh with the second toothed portion of the first mentioned planet gear and the power transfer pinion with the second mentioned planet gear.

2. In a device of the nature described, comprising a drive shaft, a driven shaft, and a unit driven by the said drive shaft, the said unit including a sun gear on the drive shaft, a carrier mounted to rotate about the drive shaft, a planet gear carried by the carrier having a toothed portion in mesh with the sun gear to be driven by the same, a second toothed portion on the planet gear, a second carrier rotatable about the drive shaft, a carrier on the driven shaft, a planet gear carried by the driven shaft carrier, a power take-off and a power transfer pinion carried by the second mentioned carrier, the power take-off pinion being in mesh with the second toothed portion of the first mentioned planet gear and the power transfer pinion with the second mentioned planet gear, the said pinions generating power about more than one center.

3. In a device of the nature described, comprising a drive shaft, a driven shaft, and a unit driven by the said drive shaft, the said unit including a sun gear on the drive shaft, a carrier mounted to rotate about the drive shaft, a planet gear carried by the carrier having a toothed portion in mesh with the sun gear to be driven by the same, a second toothed portion on the planet gear, a second carrier rotatable about the drive shaft, a carrier on the driven shaft, a planet gear carried by the driven shaft carrier, a pair of spaced apart shafts rotatably mounted in the second carrier, a line running thru the center of each of the said spaced apart shafts and the center of the second mentioned planet gears being disposed at approximately 45 degrees to a center line running through the center of the second mentioned planet gears and drive shaft, a power take-off pinion on each of the shafts in mesh with the second toothed portion of the first planet gear, and a power transfer pinion on each of the said shafts in mesh with the second mentioned planetary gear.

4. A device of the nature described, comprising a drive shaft, a driven shaft, and a unit driven by the drive shaft, the said unit including a sun gear on the drive shaft, a carrier rotatably mounted on the drive shaft, a stationary ring gear, a planet gear carried by the carrier and provided with a pair of toothed surfaces one of which is in mesh with the sun gear and stationary ring gear, a second carrier rotatably mounted on the drive shaft, a carrier secured to the driven shaft, a planet gear rotatably carried by the driven shaft carrier, a shaft rotatably mounted on the second carrier, a power take-off pinion on one end of the said shaft in mesh with the second toothed surface of the first mentioned planet gear, a power transfer pinion on the other end of the shaft in mesh with the second mentioned planet gear, an extension on the said second mentioned planet gear, a planet gear on the said extension, and a stationary ring gear in mesh with the said last named planet gear.

ALBERT T. HARRIS.